United States Patent [19]

Schorn et al.

[11] Patent Number: 5,069,036
[45] Date of Patent: Dec. 3, 1991

[54] EXHAUST GAS LINE SYSTEM FOR A SUPERCHARGED INTERNAL COMBUSTION ENGINE

[75] Inventors: Norbert Schorn, Meersburg; Hugo Stock, Bergisch Gladbach; Richard Bartels, Niederkassel-Mondorf; Willi Fendel, Cologne, all of Fed. Rep. of Germany

[73] Assignee: Kloeckner-Humboldt-Deutz AG, Cologne, Fed. Rep. of Germany

[21] Appl. No.: 450,226

[22] Filed: Dec. 13, 1989

[51] Int. Cl.⁵ .............................................. F01N 7/10
[52] U.S. Cl. .................................................. 60/323
[58] Field of Search ...................... 60/323, 322, 282

[56] References Cited

FOREIGN PATENT DOCUMENTS

| | | | |
|---|---|---|---|
| 207443 | 1/1987 | European Pat. Off. | 60/323 |
| 842873 | 7/1952 | Fed. Rep. of Germany | 60/323 |
| 3121341 | 12/1982 | Fed. Rep. of Germany | 60/323 |
| 38434 | 3/1979 | Japan | 60/323 |

*Primary Examiner*—Douglas Hart
*Attorney, Agent, or Firm*—Charles L. Schwab

[57] ABSTRACT

An exhaust gas line system for an internal combustion engine supercharged by an exhaust gas turbocharger, having a modularly assembled exhaust gas collector pipe (1), which supplies the turbocharger with exhaust gas and is connected to all cylinders of a bank of cylinders via connecting lines (2), the exhaust gas collector pipe (1) being closed at its end distant from the turbine and exhibiting, over its entire length, a nearly constant cross section. It is the object of the invention to create, for a supercharged internal combustion engine, an exhaust gas line system that utilizes the kinetic energy of the exhaust gas in the most loss-free possible fashion for driving the turbocharger. This is achieved by the connecting lines (2) discharging into the exhaust gas collector pipe (1) via a diffusor-shaped inlet opening (3) and by providing a constriction (4) upstream of the inlet opening.

2 Claims, 2 Drawing Sheets

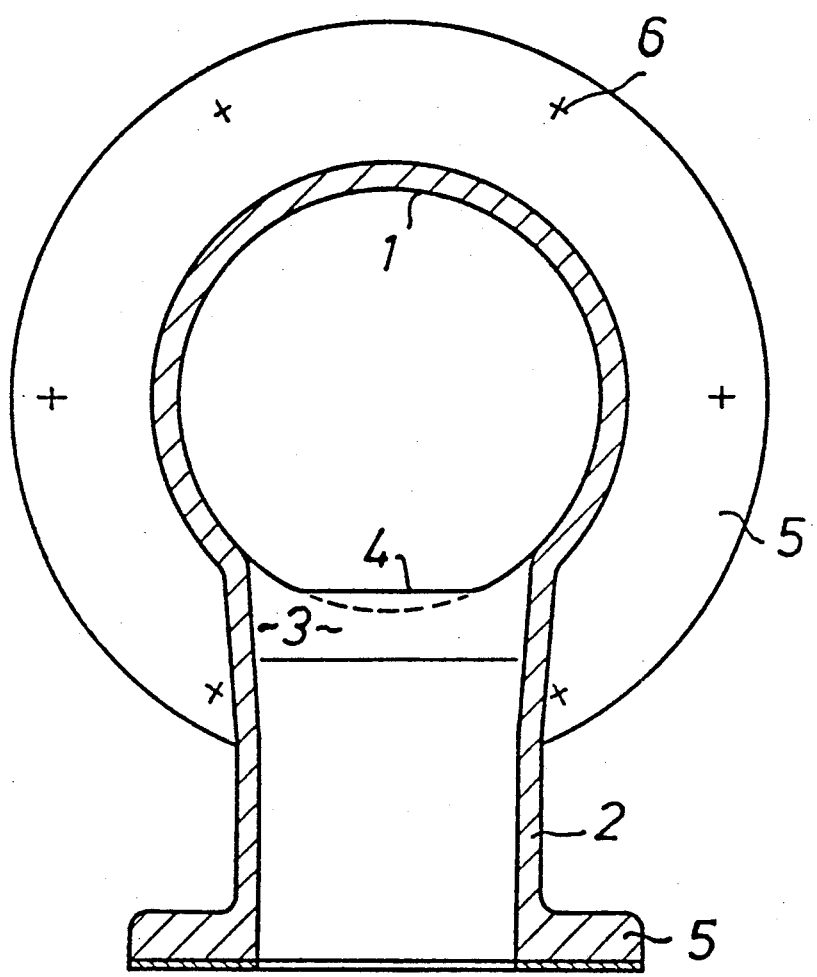

EXHAUST GAS LINE SYSTEM FOR A SUPERCHARGED INTERNAL COMBUSTION ENGINE

TECHNICAL FIELD

This invention relates to an exhaust gas line system for a supercharged internal combustion engine in accordance with the preamble of claim 1.

PRIOR ART STATEMENT

Federal Republic of Germany patent DE-PS 28 02 515 describes an exhaust gas collector for an internal combustion engine supercharged by an exhaust gas turbocharger, having a modularly assembled exhaust gas collector pipe of small diameter, which supplies the supercharger turbine with exhaust gases and is connected to all cylinders of a bank of cylinders via short connecting lines. Further, the collector pipe is closed at its end distant from the turbine and the cross section of the collector pipe is constant over the length of said pipe. In order to increase the flow velocity of the gases in the collector pipe, the connecting lines discharge into the collector pipe via ejector nozzles. The ejector nozzles are formed onto the collector pipe as short nozzles in the immediate vicinity of the discharge of the connecting line.

OBJECTS AND BRIEF SUMMARY OF THE INVENTION

It is the object of the invention to create, for a supercharged internal combustion engine, an exhaust gas line system that utilized the kinetic energy of the exhaust gas in the most loss-free possible fashion for driving the turbocharger.

Connecting lines discharge exhaust gases from the cylinders into the exhaust gas collector pipe via a diffusor-shaped inlet opening and a constriction is located upstream of the inlet opening. This results in the kinetic energy of the exhaust gas being utilized in a loss-free fashion for driving the turbocharger.

In a preferred embodiment of the invention, the constriction is made ramp-shaped.

Also in accordance with the invention, the diffusor-shaped forming of the inlet opening is placed in the connecting line. By means of this measure, the exhaust gas flow is expanded while still in the connecting line before reaching the inlet opening into the exhaust gas collector pipe.

BRIEF DESCRIPTION OF THE DRAWINGS

One embodiment of the invention is shown in the drawings in which:

FIG. 1 shows a longitudinal section through a part of an exhaust gas line system and FIG. 2 shows a section through the exhaust gas collector pipe of FIG. 1 along the line II—II.

DETAILED DESCRIPTION OF THE DRAWINGS

Figure 1:
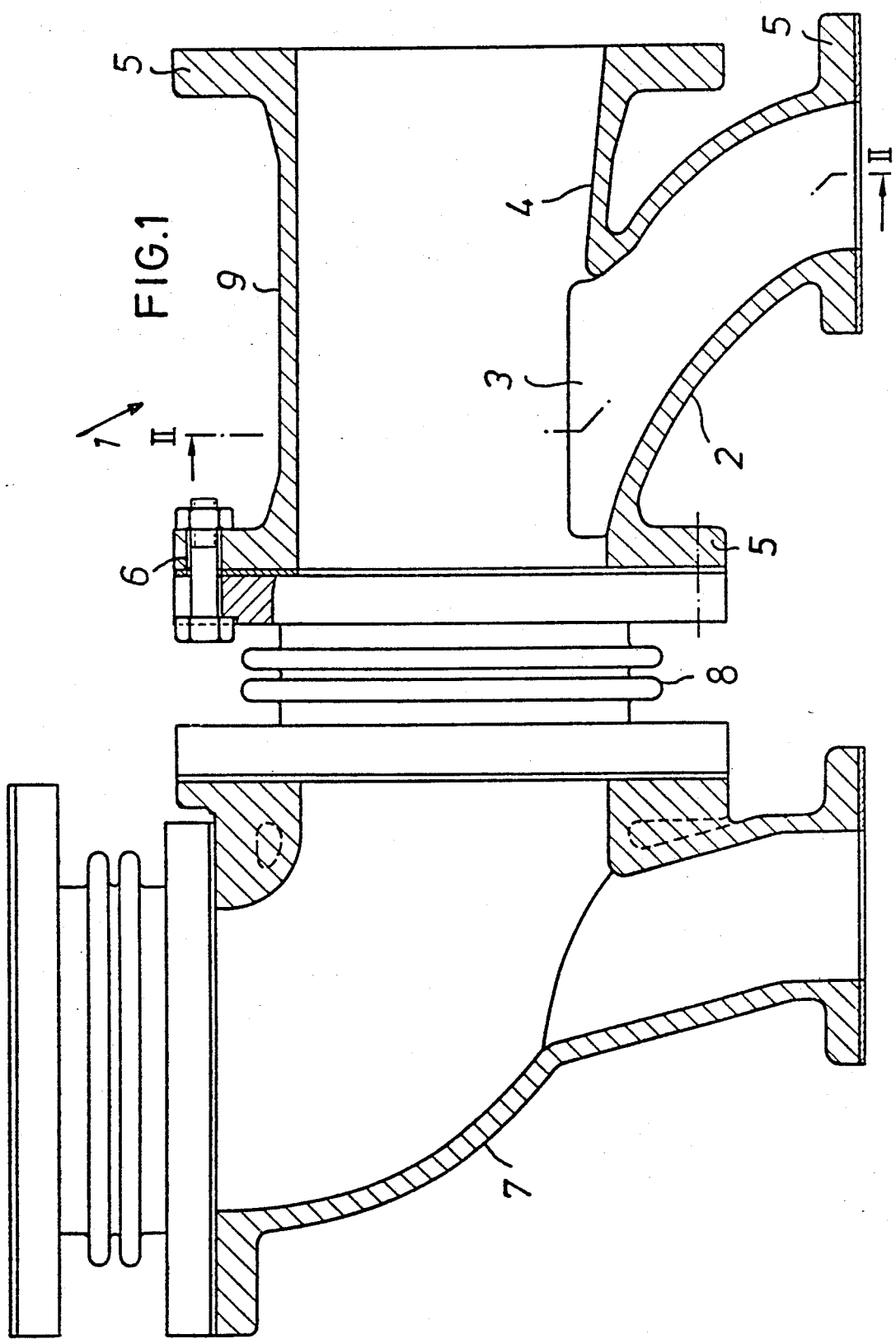

The exhaust gas line system illustrated in the drawings extends between a supercharged multi-cylinder internal combustion engine, not illustrated, and an exhaust gas turbocharger of commercially available construction. The exhaust gas ports of the internal combustion engine, not shown, are connected via connecting lines 2 to an exhaust gas collector line 1 attached to the turbine inlet of the turbine of the exhaust gas turbocharger. The exhaust gas collector pipe 1 is modularly assembled, only one module 9 and the connecting fitting 7 to the turbocharger being shown in the figure. The exhaust gas collector pipe 1 is closed at its end distant from the turbine and exhibits, over its entire length, a nearly constant cross section. The individual modules each include a segment of the collector pipe 1 and a connecting line 2 and they can be connected to one another directly or via connecting flanges 8. The connecting line 2 of each module 9 has a constant cross section except for a diffusor shaped inlet opening 3 which gradually expands to a junction with the module segment of the exhaust gas collector pipe 1. In accordance with the invention, this diffusor-shaped forming of the inlet opening 3 extends into the connecting line 2 and, indeed, advantageously approximately 2 cm. What is more, the connecting line 2 discharges into the exhaust gas collector pipe 1 in the direction of flow of the exhaust gases.

In accordance with the invention, a constriction 4 is arranged in the segment of the collector pipe 1 of the module 9 immediately upstream of the inlet opening 3, which constriction is made ramp-shaped. This ramp-shaped constriction 4 is made linear over its entire length and continuously ascending. The narrowest cross section of the exhaust gas collector pipe 1 is located immediately upstream of the inlet opening 3 of the connecting line 2 into the exhaust gas collector pipe 1. By this gradually reduced cross section in the gas collector pipe (1), effected by the ramp-shaped constriction 4, a slight increase in dynamic air pressure is formed ahead of the inlet opening, by which means, in conjunction with the diffusor-shaped forming of the inlet opening 3, the exhaust gas flow is improved. On the side of the exhaust gas collector pipe lying opposite the inlet opening 3, the collector pipe is made in straight-line fashion. So that the individual modules 9 or the connecting line 2 can be attached to the adjacent modules or to the connectors. The ends of each of the modules 9 are provided with flanges 5, in which holes 6 are advantageously situated.

The connecting fitting 7 by which an end module of the exhaust gas collector pipe 1 is connected to the supercharging turbine of the exhaust gas turbocharger is made as an ell with a 90 degree bend. The connecting line discharging into this ell does not have a diffusor-shaped inlet opening as provided in the modules 9. Nor is the ramp-shaped constriction located upstream of this inlet opening.

The embodiments of the invention in which an exclusive property or privilege is claimed are defined as follows:

1. An exhaust gas line system for an internal combustion engine supercharged by an exhaust gas turbocharger, having a modularly assembled exhaust gas collector pipe (1), which supplies the turbocharger with exhaust gas and is connected to all cylinders of a bank of cylinders via connecting lines (2) having individual junctions with said collector pipe (1), the exhaust gas collector pipe (1) including a plurality of individually identical modules (9), each of which includes a segment of said collector pipe (1), one of said connecting lines (2), a diffusor-shaped inlet opening (3) in said one connecting line (2) at the latter's junction with said segment of said gas collector pipe (1) said diffusor-shaped inlet opening (3) extending into said one connecting line and gradually increasing in cross section in the direction towards its junction with said segment of said collector pipe (2), and a constriction (4) in said segment of said gas collector pipe (1) immediately upstream of said inlet opening (3) providing a reduced cross section in said segment of said collector pipe whereby a slight increase in dynamic air pressure is effected in said segment of said collector pipe (1) immediately upstream of said inlet opening (3).

2. The exhaust gas line system of claim 1, wherein said constriction (4) is ramp-shaped to produce a gradually reduced cross section in said segment of said collector pipe (1).

* * * * *

UNITED STATES PATENT AND TRADEMARK OFFICE
CERTIFICATE OF CORRECTION

PATENT NO.  : 5,069,036
DATED       : December 3, 1991
INVENTOR(S) : Norbert Schorn, Hugh Stock, Richard Bartels and Willi Fender It is certified that error appears in the above-identified patent and that said Letters Patent is hereby corrected as shown below:

On the cover page of the patent insert:

--- [30]     Foreign Application Priority Data

Dec. 14, 1988 [DE] Fed. Rep. of Germany ...... P 38 41 983.1 ---

Signed and Sealed this

Thirteenth Day of April, 1993

*Attest:*

STEPHEN G. KUNIN

*Attesting Officer*     *Acting Commissioner of Patents and Trademarks*